United States Patent
Al-Hadhrami et al.

(10) Patent No.: US 8,141,379 B2
(45) Date of Patent: Mar. 27, 2012

(54) HYBRID SOLAR AIR-CONDITIONING SYSTEM

(75) Inventors: Luai M. Al-Hadhrami, Dhahran (SA); Aftab Ahmad, Dhahran (SA); Shafiqur Rehman, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 0 days.

(21) Appl. No.: 12/959,110

(22) Filed: Dec. 2, 2010

(65) Prior Publication Data

US 2011/0138832 A1     Jun. 16, 2011

(51) Int. Cl.
*F25D 23/00* (2006.01)
(52) U.S. Cl. .............. 62/271; 62/481; 62/238.3
(58) Field of Classification Search ........... 62/481, 62/238.3, 271
See application file for complete search history.

(56) References Cited

U.S. PATENT DOCUMENTS

| | | | | |
|---|---|---|---|---|
| 4,803,846 A | * | 2/1989 | Assaf | 62/94 |
| 5,170,633 A | * | 12/1992 | Kaplan | 62/94 |
| 6,178,762 B1 | * | 1/2001 | Flax | 62/271 |
| 6,334,316 B1 | | 1/2002 | Maeda et al. | |
| 6,497,107 B2 | | 12/2002 | Maisotsenko et al. | |
| 7,197,887 B2 | | 4/2007 | Maisotsenko et al. | |
| 2003/0029185 A1 | | 2/2003 | Kopko | |
| 2008/0276640 A1 | | 11/2008 | Bhatti et al. | |
| 2009/0308091 A1 | | 12/2009 | De Lima | |
| 2010/0154216 A1 | * | 6/2010 | Hulen | 29/890.033 |

FOREIGN PATENT DOCUMENTS

WO    WO2004081462    9/2004
(A1)

* cited by examiner

*Primary Examiner* — Cheryl J Tyler
*Assistant Examiner* — Jonathan Koagel
(74) *Attorney, Agent, or Firm* — Richard C. Litman

(57) ABSTRACT

The hybrid solar air-conditioning system includes an air intake having an air drying system that uses a liquid desiccant to dry ambient air, a desiccant regeneration system that uses a heat exchanger having oil heated by solar energy to remove water from the desiccant, an indirect evaporative air conditioner that uses an air-air heat exchanger to cool the dried air indirectly with evaporatively cooled air, a distilled water recovery system to recover water from the desiccant and from the evaporatively cooled air in the form of distilled water, and a microprocessor-based controller to control room temperature and relative humidity, and to regulate air intake and the flow of desiccant and oil in the system. The hybrid system enables the use of evaporative cooling in regions having high humidity.

10 Claims, 3 Drawing Sheets

HYBRID SOLAR AIR-CONDITIONING SYSTEM

BACKGROUND OF THE INVENTION

1. Field of the Invention

The present invention relates to air-conditioning systems, and more specifically to a hybrid solar air-conditioning system.

2. Description of the Related Art

Air-conditioning systems are a major consumer of electricity in Saudi Arabia. The use of air conditioners in the residential and commercial sectors has been increased significantly in recent years. Both power generator and conventional vapor compression electric air-conditioning systems operate at lower efficiencies when ambient air temperatures and humidity are high, and this increases the peak demand on the grid even further.

Evaporative cooling technologies offer an alternative to conventional vapor compression electric air-conditioning systems in hot, dry climates and can provide some level of cooling for a fraction of the energy consumption. The main drawback of the traditional evaporative coolers is that they are ineffective for places where humidity is high. An evaporatively cooled space can feel uncomfortable because the increased humidity can impair the body's ability to cool itself through perspiration.

A partial solution to the above drawback of the evaporative coolers is to use the direct evaporatively cooled air to cool another stream of air using an air-air heat exchanger, which is then supplied to the conditioned space. The indirect evaporative cooling takes advantage of the inexpensive cooling done through evaporation without the increase in humidity in the conditioned space. Indirect or combined indirect/direct or multistage systems are more complex and costly than simple direct evaporative coolers, but they provide better interior comfort conditions. The indirect evaporative cooling system has limitations in regions where humidity is high, especially in coastal areas of Saudi Arabia.

Thus, a hybrid solar air-conditioning system solving the aforementioned problems is desired.

SUMMARY OF THE INVENTION

The hybrid solar air-conditioning system includes an air intake having an air drying system that uses a liquid desiccant to dry ambient air, a desiccant regeneration system that uses a heat exchanger having oil heated by solar energy to remove water from the desiccant, an indirect evaporative air conditioner that uses an air-air heat exchanger to cool the dried air indirectly with evaporatively cooled air, a distilled water recovery system to recover water from the desiccant and from the evaporatively cooled air in the form of distilled water, and a microprocessor-based controller to control room temperature and relative humidity, and to regulate air intake and the flow of desiccant and oil in the system. The hybrid system enables the use of evaporative cooling in regions having high humidity.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The hybrid solar air-conditioning system includes an air intake having an air drying system that uses a liquid desiccant to dry ambient air, a desiccant regeneration system that uses a heat exchanger having oil heated by solar energy to remove water from the desiccant, an indirect evaporative air conditioner that uses an air-air heat exchanger to cool the dried air indirectly with evaporatively cooled air, a distilled water recovery system to recover water from the desiccant and from the evaporatively cooled air in the form of distilled water, and a microprocessor-based controller to control room temperature and relative humidity, and to regulate air intake and the flow of desiccant and oil in the system. The hybrid system enables the use of evaporative cooling in regions having high humidity.

Figure 1:
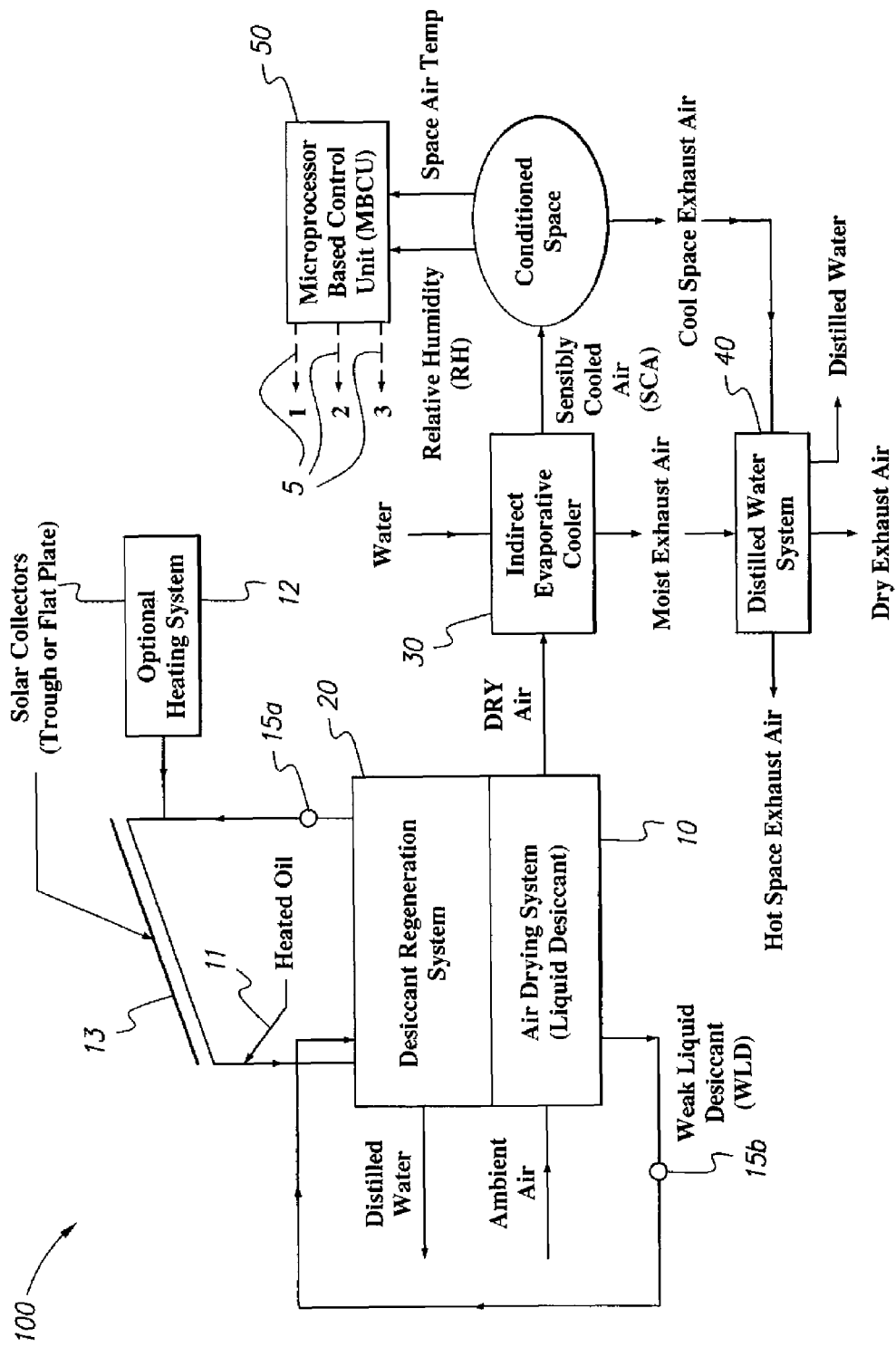
FIG. 1 is a block diagram of a hybrid solar air-conditioning system according to the present invention.
Figure 2A:
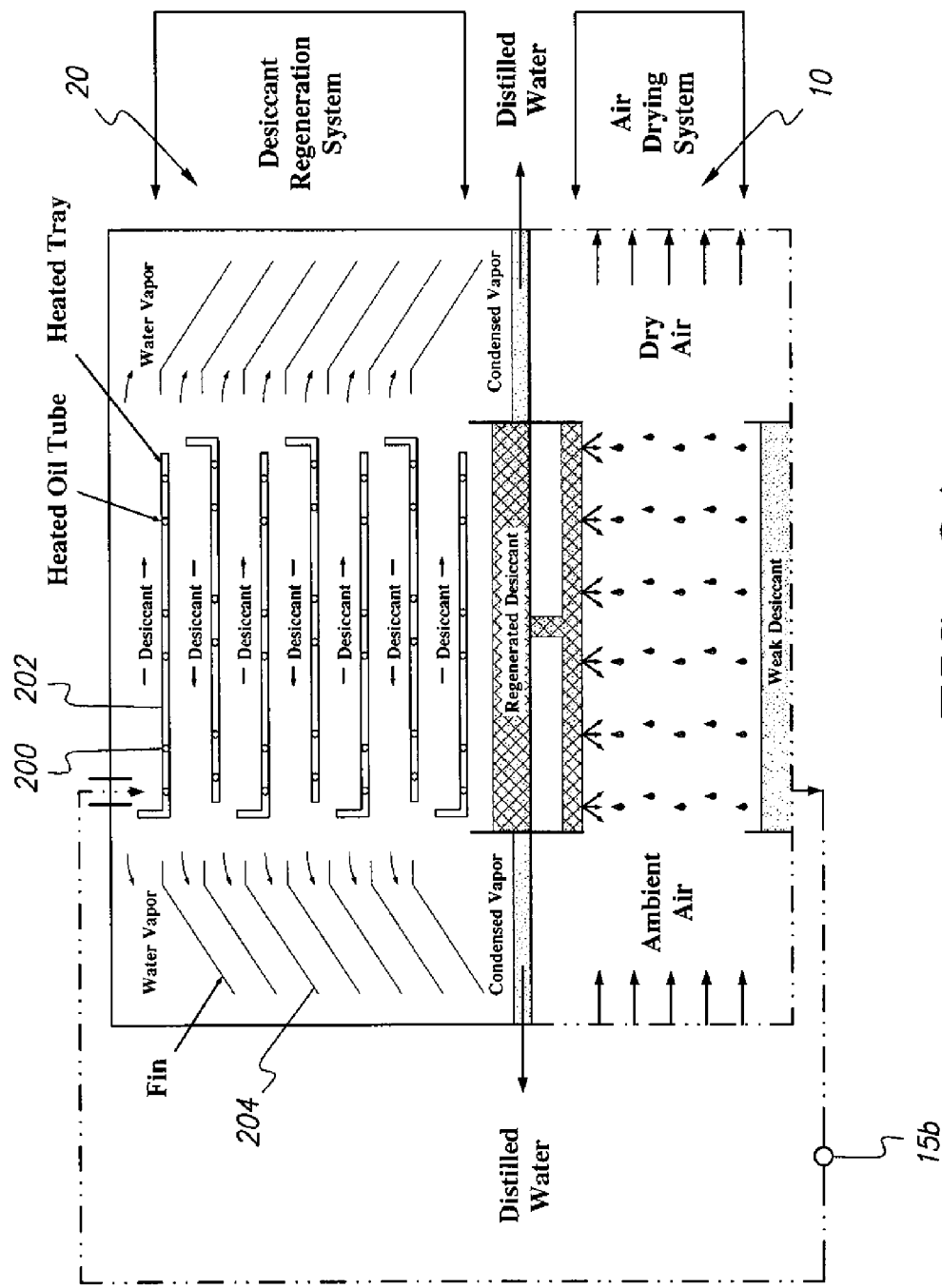
FIG. 2A is a detailed block diagram of the air drying and desiccant regeneration portions of the hybrid solar air-conditioning system according to the present invention.
Figure 2B:
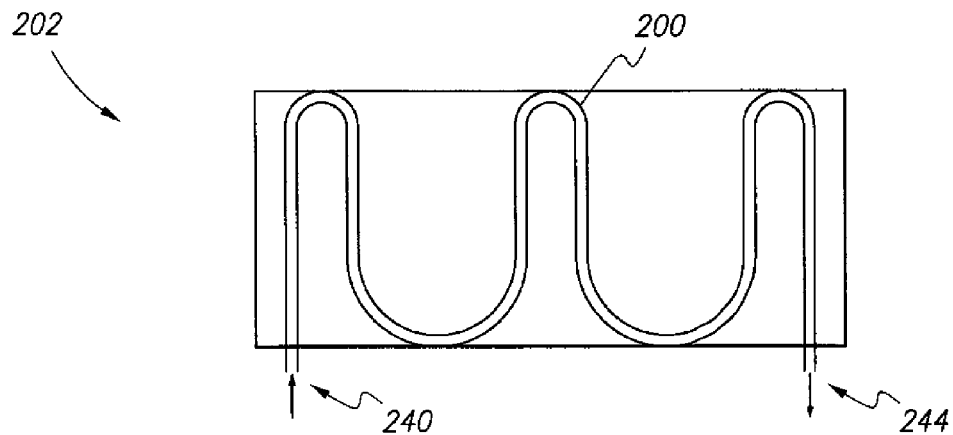
FIG. 2B is a schematic diagram of the heated tray portion of the hybrid solar air-conditioning system according to the present invention.
Figure 3:
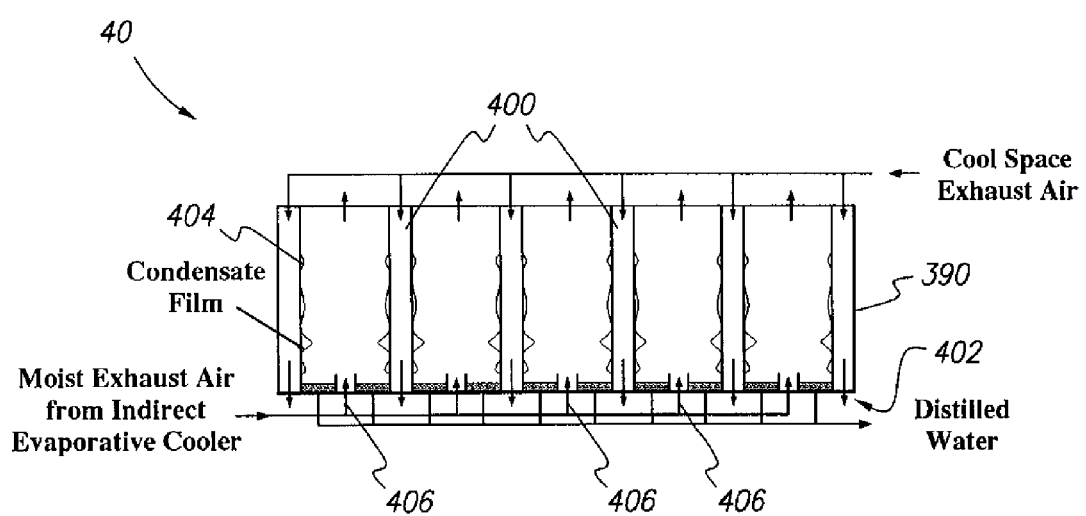
FIG. 3 is a detailed block diagram of the distilled water portion of the hybrid solar air-conditioning system according to the present invention.

As shown in FIGS. 1-3, the hybrid solar air-conditioning system 100 includes a desiccant regeneration system that uses solar energy collected by solar parabolic troughs or flat plate collectors 13 and an air drying system having a liquid desiccant system 20 to control the moisture content of intake air, which is then sent to an indirect evaporative cooling system. The hybrid solar air-conditioning system is expected to consume 220-260 Watts/ton.

The hybrid system utilizes the solar energy to control the humidity of the intake air to the indirect evaporative cooling system. Additionally, the system can produce distilled water at two stages in the air-cooling process. The indirect evaporative cooler uses brackish water. Renewable energy (e.g., solar energy) can be used for regeneration of the desiccant. Thus, the system conserves energy.

As most clearly shown in FIG. 1, the hybrid solar air-conditioning system 100 uses oil as a working fluid in the desiccant regeneration system 20. The oil is in a closed loop, pumped and re-circulated by oil pump 15a to pick up heat collected by solar collectors 13 and then flow through a heat exchanger in the desiccant regeneration system 20. An optional heating system 12 may also be provided to heat the flowing oil when solar energy is insufficient. Ambient air of unknown humidity enters the air drying system 10. The air drying system 10 includes a liquid desiccant, which lowers the humidity of the air flowing through the air drying system 10. The liquid desiccant may be any liquid desiccant well known in the art for removing water from air.

The liquid desiccant, having done work in the drying system 10, becomes weak (WLD) by the absorption of water, and is then pumped via desiccant pump 15b for recirculation in the desiccant regeneration system 20, where there is heat exchange between the pumped heated oil and the pumped, cooler weak liquid desiccant (WLD) to thereby regenerate the drying capacity of the desiccant by removal of water from the desiccant.

A by-product of the desiccant heating process in desiccant regeneration system 20 is distilled water, which has an outlet to exit the desiccant regeneration system 20. The regenerated desiccant then flows back into the air drying system 10 to do more work removing water from the flowing humid ambient air.

As most clearly shown in FIG. 2A, the desiccant regenerator 20 is made of a housing in which weak desiccant can flow through for heat exchange with the heated oil. The heat exchanger mechanism disposed in the regenerator 20 comprises a stack of heated trays 202 through which a heated oil tube 200 is disposed. FIG. 2B shows the tube oil inlet 240 and oil outlet 244. The tube 200 has a serpentine geometry, with alternating tight and loose turns of the oil tube 200 through the tray 202. The desiccant flows through the mechanism over the hot trays 202 for heat exchange, which results in desiccant regeneration and the release of water vapor.

Fin-shaped channels 204 extending to lateral sidewalls of the regenerator 20 direct the water vapor from an upper portion of the regenerator 20 to a lower portion of the regenerator 20 while condensing the water vapor into distilled water, which collects at the bottom tray of desiccant regeneration system 20 and exits via outlets in the lower portion of the regenerator 20. Regenerated desiccant fluid collects in a lower portion of the regenerator 20, which interfaces with an upper portion of the air drying system 10 to allow the ambient air to be dried by the regenerated desiccant, which is sprayed into the air drying chamber 10.

The distilled water can be used as a feed into the indirect evaporative cooler 30. Moreover, evaporation of water makes the desiccant strong. The strong liquid desiccant collected in the tray is fed into the air drying system 10 for moisture absorption.

The air drying system 10 exhausts dry air, which is fed into an indirect evaporative cooler 30 as intake air. The intake air is split into two air streams. One stream is evaporatively cooled by drawing the stream over a supply of water, which may be brackish water, and the other stream is sensibly cooled by air-air heat exchange with the evaporatively cooled stream.

Water entering the indirect evaporative cooler 30 chills the dry air by evaporation. Chilled dry air (sensibly cooled air SCA) from the cooler 30 is exhausted into the space to be air conditioned. Additionally, the cooler 30 exhausts moist exhaust air, which is directed to a distilled water system 40, which outputs hot space exhaust air, dry exhaust air, and distilled water.

As most clearly shown in FIG. 3, the distilled water system 40 includes a heat exchanger 390 having a plurality of narrow chambers 400 through which cool space exhaust air is directed, juxtaposed against a plurality of wide chambers through which moist exhaust air 406 from the indirect evaporative cooler 30 is directed.

The heat exchange due to the juxtaposed flow of cool space air and moist exhaust air results in a condensate film 404 being developed along the chamber walls of the heat exchanger 390, which is captured at the bottom of the heat exchanger 390 for distribution as distilled water. The cool space exhaust air is expelled from the exchanger 390 through cool space exhaust air outlet 402.

The microprocessor-based control unit 50 is used to maintain the room air temperature and relative humidity based on the space cooling load. In order to achieve the desired comfort condition, the microprocessor-based controller regulates the flow of desiccant liquid, oil and supply air. The microprocessor control unit 50 thermostatically regulates the air temperature of the conditioned space via a thermostat and control signals 5, including a first control signal 1 to the air drying system 10, a second control signal 2 to the desiccant regeneration system 20, and a third control signal 3 to the evaporative cooler 30. Thus, it is readily apparent that system 100 conditions the ambient air for space cooling and provides distilled water for other use.

It is to be understood that the present invention is not limited to the embodiment described above, but encompasses any and all embodiments within the scope of the following claims.

We claim:

1. A hybrid solar air-conditioning system, comprising:
a plurality of solar collectors arranged for concentrating thermal solar energy;
a tubular conduit circulating a fluid-phase working medium in proximity to the plurality of solar collectors, the thermal solar energy concentrated by the plurality of solar collectors being transferred to heat the fluid phase working medium flowing through the tubular conduit;
a liquid desiccant regenerator having a heated fluid inlet allowing for entry of the tubular conduit into the desiccant regenerator and a heated fluid outlet for allowing exit of the tubular conduit from the desiccant regenerator;
a plurality of trays disposed in the desiccant regenerator for receiving a liquid desiccant, the tubular conduit being embedded within each of said plurality of trays, transferring heat from the fluid-phase working medium flowing through the tubular conduit to the plurality of trays, wherein heat transfer from the fluid-phase working medium to the plurality of trays evaporates moisture within the liquid desiccant received therein to form a regenerated liquid desiccant, the liquid desiccant being a separate and distinct fluid from the fluid-phase working medium;
an air drying chamber having means for accepting the regenerated liquid desiccant from the desiccant regenerator;
means for accepting air from an ambient environment to come in contact with the regenerated liquid desiccant, wherein the regenerated liquid desiccant is weakened and the ambient air is dried;
means for recirculating the weakened fluid desiccant into the desiccant regenerator;
a plurality of fin-shaped channels mounted adjacent the desiccant regenerator for collecting water vapor released from the liquid desiccant during regeneration thereof for dispensing as distilled water;
an indirect evaporative cooler having a dry air intake, a sensibly cooled air outlet, and a water input, the water input accepting the distilled water distributed from the desiccant regenerator;
means for distributing the dried ambient air into the dry air intake of the indirect evaporative cooler, wherein the water accepted by the indirect evaporative cooler sensibly cools the dried ambient air within the indirect evaporative cooler;
means for distributing the sensibly cooled air from the indirect evaporative cooler to an environmental space requiring sensibly cooled air; and
a microprocessor-based control circuit connected to the desiccant regenerator, the air drying chamber and the indirect evaporative cooler, for providing thermostatic control over the sensibly cooled environmental space.

2. The hybrid solar air-conditioning system according to claim 1, further comprising an auxiliary heating system for the working fluid.

3. The hybrid solar air-conditioning system according to claim 1, wherein the working fluid is oil.

4. The hybrid solar air-conditioning system according to claim 1, wherein said tubular conduit embedded in said plurality of trays is arranged in a serpentine pattern within said plurality of trays.

5. The hybrid solar air-conditioning system according to claim 1, further comprising means for exhausting moist air developed in said indirect evaporative cooler.

6. The hybrid solar air-conditioning system according to claim 5, further comprising:
   an air-to-air heat exchanger accepting the moist exhaust air from said indirect evaporative cooler and exhaust air from said sensibly cooled environmental space, wherein heat exchange between said moist exhaust air and said sensibly cooled environmental space exhaust air results in a condensate film of water developed in said heat exchanger; and
   means for collecting said condensate film for distribution as distilled water from said air-to-air heat exchanger.

7. The hybrid solar air-conditioning system according to claim 1, wherein each of said trays has horizontally opposed first and second ends, each said tray having a horizontally extending base and a vertically extending sidewall.

8. The hybrid solar air-conditioning system according to claim 7, wherein said plurality of trays are stacked vertically.

9. The hybrid solar air-conditioning system according to claim 8, wherein said plurality of trays comprises:
   a first set of trays having each said vertically extending sidewall extending from a respective first end of the respective horizontally extending base; and
   a second set of trays having each said vertically extending sidewall extending from a respective second end of the respective horizontally extending base.

10. The hybrid solar air-conditioning system according to claim 9, wherein said first and second sets of trays alternate in a vertical stack of said plurality of trays.

* * * * *